(12) United States Patent
Feyk et al.

(10) Patent No.: US 8,799,540 B2
(45) Date of Patent: Aug. 5, 2014

(54) PROVIDING SIGNALS TO ELECTRONIC CONNECTORS

(75) Inventors: Craig Thomas Feyk, Edmonds, WA (US); Eric Jason Putnam, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 162 days.

(21) Appl. No.: 12/652,652

(22) Filed: Jan. 5, 2010

(65) Prior Publication Data

US 2011/0167179 A1 Jul. 7, 2011

(51) Int. Cl.
G06F 13/12 (2006.01)
G06F 11/00 (2006.01)

(52) U.S. Cl.
USPC ............... 710/62; 710/58; 710/125; 713/330; 714/36

(58) Field of Classification Search
USPC .......................................................... 710/62
See application file for complete search history.

(56) References Cited

U.S. PATENT DOCUMENTS

| | | | |
|---|---|---|---|
| 5,210,855 A * | 5/1993 | Bartol | 710/302 |
| H0001221 H * | 8/1993 | Best et al. | 360/99.16 |
| 5,482,793 A | 1/1996 | Burns et al. | |
| 5,545,935 A | 8/1996 | Stewart | |
| 5,714,870 A | 2/1998 | Dunstan | |
| 5,729,115 A | 3/1998 | Wakefield | |
| 5,731,683 A | 3/1998 | Nakanishi | |
| 5,844,400 A | 12/1998 | Ramsier et al. | |
| 6,138,240 A | 10/2000 | Tran et al. | |
| 6,625,477 B1 | 9/2003 | Wakefield | |
| 6,714,016 B2 | 3/2004 | Odaohhara et al. | |
| 6,810,338 B2 | 10/2004 | Mercke | |
| 6,829,726 B1 | 12/2004 | Korhonen | |
| 7,130,190 B1 | 10/2006 | Baker | |
| 7,392,147 B2 | 6/2008 | Lo et al. | |
| 7,396,257 B2 | 7/2008 | Takahashi | |
| 7,408,883 B2 * | 8/2008 | Deragon et al. | 370/249 |
| 7,702,984 B1 * | 4/2010 | Lee et al. | 714/742 |
| 7,975,178 B2 * | 7/2011 | Kim et al. | 714/36 |
| 2001/0017485 A1 * | 8/2001 | Yoo | 307/66 |
| 2002/0157053 A1 * | 10/2002 | Chen et al. | 714/744 |

(Continued)

FOREIGN PATENT DOCUMENTS

CN 1462370 12/2003
CN 1578047 2/2005

OTHER PUBLICATIONS

Relay types, Sep. 2006, National Instruments, pp. 1-7.*

(Continued)

Primary Examiner — Henry Tsai
Assistant Examiner — Dean Phan
(74) Attorney, Agent, or Firm — John Jardine; Andrew Sanders; Micky Minhas

(57) ABSTRACT

A connector can be activated or deactivated by providing power and data signals to the connector at different times. In some embodiments, the power signals are provided to a connector, and then the data signals are provided to the connector after a delay. Providing power and data signals at different times can, in at least some cases, better mimic the timing of signals provided by a connector as the connector is attached to an electronic device. This can aid automated testing of the electronic device. It can also be used to control access of the device through the connector.

17 Claims, 15 Drawing Sheets

(56) References Cited

U.S. PATENT DOCUMENTS

| | | | |
|---|---|---|---|
| 2003/0014704 A1* | 1/2003 | Nishimura | 714/736 |
| 2007/0004397 A1 | 1/2007 | Le | |
| 2007/0075809 A1* | 4/2007 | Shen et al. | 335/78 |
| 2008/0007222 A1 | 1/2008 | Nance | |
| 2008/0054723 A1 | 3/2008 | Noh | |
| 2008/0192666 A1 | 8/2008 | Koskan | |
| 2008/0200218 A1 | 8/2008 | Bobst | |
| 2008/0231117 A1 | 9/2008 | Bucur et al. | |
| 2008/0250165 A1 | 10/2008 | Reynolds et al. | |
| 2009/0225230 A1 | 9/2009 | Arroyo et al. | |
| 2010/0068996 A1* | 3/2010 | Haartsen | 455/41.1 |

OTHER PUBLICATIONS

Kazman et al., "A Simulation Test-Bed for Mobile Adaptive Architectures," *Computer Standards & Interfaces*, Elsevier Science B.V., 2003; pp. 291-98.

Kazman et al., "A Simulation Test-Bed for Mobile Adaptive Architectures," *Computer Standards & Interfaces*, Elsevier Science B.V., 2003; pp. 291-298.

Office Action from the United States Patent & Trademark Office in co-pending U.S. Appl. No. 12/652,647, dated Feb. 8, 2012.

Notice on the First Office Action dated Feb. 1, 2013, from Chinese Patent Application No. 201110021535.3, 11 pp.

Notice on the First Office Action dated Mar. 7, 2013, from Chinese Patent Application No. 201110021590.2, 9 pp.

Final Office Action dated Sep. 14, 2012, from U.S. Appl. No. 12/652,647, 14 pp.

Office Action dated Apr. 29, 2013, from U.S. Appl. No. 12/652,647, 13 pp.

Final Office action dated Nov. 14, 2013 from U.S. Appl. No. 12/652,647, 12 pp.

Notice on the Second Office Action dated Jul. 12, 2013, from Chinese Patent Application No. 201110021535.3, 11 pp. (English translation).

Notice on the Second Office Action dated Oct. 30, 2013, from Chinese Patent Application No. 201110021590.2, 9 pp. (English translation).

Notice on the Third Office Action dated Dec. 9, 2013, from Chinese Patent Application No. 201110021535.3, 9 pp. (English translation).

\* cited by examiner

PROVIDING SIGNALS TO ELECTRONIC CONNECTORS

FIELD

The disclosed technologies relate to providing signals to electronic connectors and/or to controlling electronic devices.

BACKGROUND

In some cases it is necessary to electronically activate or deactivate a connector that is coupled to an electronic device. One non-limiting example is in the context of testing an electronic device, where a test may examine the effect of removing and/or inserting a connector into the device. While it may be possible to physically remove or insert the connector, an electronic approach could be faster and require less human intervention. However, simply energizing or de-energizing the connector does not necessarily adequately mimic physical removal or insertion of the connector.

SUMMARY

A connector can be activated or deactivated by providing power and data signals to the connector at different times. In some embodiments, the power signals are provided to a connector, and then the data signals are provided to the connector after a delay. Providing power and data signals at different times can, in at least some cases, better mimic the timing of signals provided by a connector as the connector is attached to an electronic device. This can aid automated testing of the electronic device. It can also be used to control access of the device through the connector.

Some embodiments of a method comprise: providing a first set of one or more signals to a first data connector, the first set of one or more signals simulating one or more data connector power signals being transmitted from a second data connector to the first data connector; and providing, after a delay following the providing of the first set of one or more signals, a second set of one or more signals to the first data connector, the second set of one or more signals simulating one or more data connector data signals being transmitted from the second data connector to the first data connector. The delay has a fixed length or a length based at least in part on a user input. The first data connector can be coupled to a hardware device undergoing a test. The first and second sets of one or more signals can be provided based at least in part on a security command.

Embodiments of an apparatus can comprise: a first circuit, the first circuit being configurable to provide power to a device connector responsive to an input signal; and a second circuit, the second circuit being configurable to provide one or more data signals to the device connector responsive to a delayed version of the input signal. The device connector can comprise a USB connector or an Ethernet connector. The first circuit comprises a latching relay. The second circuit comprises a solid state switch. The device connector is a first device connector, and the input signal and the delayed version of the input signal is configured to mimic the insertion of a second device connector into the first device connector. A delay between the input signal and the delayed version of the input signal is adjustable. The device connector can be coupled to one or more battery-powered devices and/or to one or more storage devices.

Embodiments of a system can comprise a control unit configured to provide, responsive to an input signal, power to a device connector and one or more data signals to the device connector, the one or more data signals following the power by a delay. The system further comprises a control computer coupled to the control unit, the control computer configured to transmit the input signal to the control unit. The system further comprises an electronic device, the electronic device being coupled to the device connector. The input signal is sent in response to one or more security determinations. The system further comprises a client computer coupled to the control unit, the control unit being configured to control access of the client computer to data received through the device connector.

Instructions for causing a computer to perform any of the methods disclosed herein can be stored on one or more computer-readable media.

The foregoing and other features of the disclosed technologies will become more apparent from the following detailed description, which refers to the accompanying figures.

DETAILED DESCRIPTION

Figure 1:
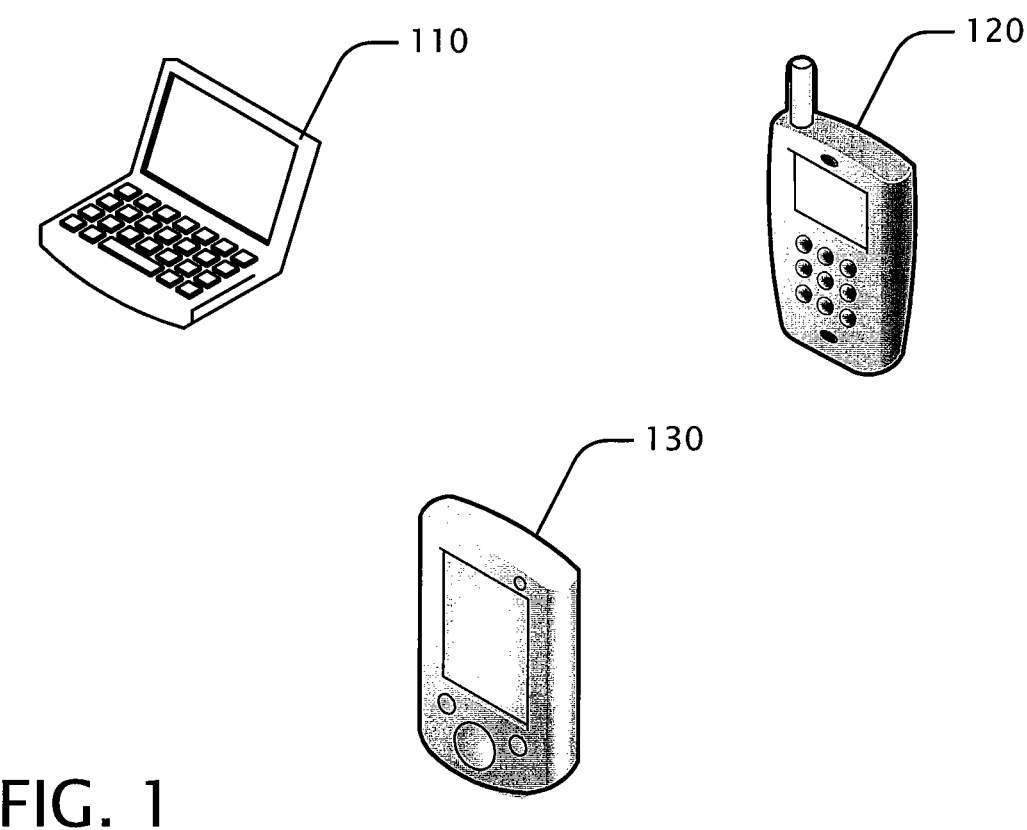
FIG. 1 shows exemplary battery-powered devices that can be used with embodiments of technologies described herein.

Disclosed below are embodiments of hardware interface technologies and/or related systems and methods. The embodiments should not be construed as limiting in any way. Instead, the present disclosure is directed toward all novel and nonobvious features and aspects of the various disclosed methods and systems, and equivalents thereof, alone and in various combinations and subcombinations with one another. The methods disclosed herein are not performed purely in the human mind.

As used in this application and in the claims, the singular forms "a," "an" and "the" include the plural forms unless the context clearly dictates otherwise. Additionally, the term "includes" means "comprises." When used in a sentence, the phrase "and/or" can mean "one or more of" the elements described in the sentence. Embodiments described herein are exemplary embodiments of the disclosed technologies unless clearly stated otherwise.

Although the operations of some of the disclosed methods and systems are described in a particular, sequential order for convenient presentation, it should be understood that this manner of description encompasses rearrangement, unless a particular ordering is required by specific language set forth below. For example, operations described sequentially can in some cases be rearranged or performed concurrently.

For the sake of simplicity, the figures may not show the various ways in which the disclosed methods and systems can be used in conjunction with other methods and systems. Additionally, the description sometimes uses terms like "provide," "transmit" and "send" to describe the disclosed technology. These and other terms are high-level abstractions of the actual operations that are performed. The actual operations that correspond to these terms may vary depending on the particular implementation and are readily discernible by one of ordinary skill in the art. Moreover, unless the context dictates otherwise, the term "coupled" means electrically or electromagnetically connected or linked and includes both direct connections or direct links and indirect connections or indirect links through one or more intermediate elements not altering the intended operation of the circuit.

Any of the methods described herein can be performed at least in part using software comprising computer-executable instructions stored on one or more computer-readable storage media. Computer-readable storage media can include non-volatile storage such as, for example, read-only memory (ROM), flash memory, hard disk drives, floppy disks and optical disks (e.g., CD, DVD). Computer-readable storage media can also include volatile storage such as, for example, random-access memory (RAM), device registers and processor registers. Any such software can be executed on a single computer or on a networked computer (for example, via the Internet, a wide-area network, a local-area network, a client-server network, or other such network).

Computer-executable instructions can be executed within a local or distributed computing environment. For clarity, only certain selected aspects of the software-based implementations are described. Other details that are well known in the art are omitted. For example, it should be understood that the disclosed technologies are not limited to any specific computer language, program, or computer. For instance, the disclosed embodiments can be implemented using a wide variety of commercially available computer systems. Any of the disclosed methods can alternatively be implemented (partially or completely) in hardware (e.g., an ASIC, PLD, or SoC).

Furthermore, any of the software embodiments (comprising, for example, computer-executable instructions for causing a computer to perform any of the disclosed methods) can be transmitted, received, or accessed through a suitable communication means. Such suitable communication means include, for example, the Internet, the World Wide Web, an intranet, cable (including fiber optic cable), magnetic communication means, electromagnetic communication means (including RF, microwave, and infrared communications), electronic communication means, or other such communication means. Such communication means can be, for example, part of a shared or private network.

FIG. 1 shows exemplary embodiments of one or more devices which can be used with at least some of the disclosed technologies, including a computer 110 (e.g., a desktop computer, a laptop computer, a netbook, a server, a thin client), a telephone 120 (e.g., a cell phone, a smartphone, a cordless phone), and a handheld computing device 130 (e.g., a personal digital assistant (PDA), a portable music or video player, a video game device, an electronic book reader). In particular embodiments, two or more of the devices 110, 120, 130 are used in combination with one or more of the disclosed technologies. Any of the devices 110, 120, 130 can be configured to receive data from and/or transmit data to a network (not shown).

Generally, at least some embodiments of technologies disclosed herein can be used with one or more electronic battery-powered devices. A battery-powered device is a device that obtains at least a portion of its operating power from one or more batteries. Battery-powered devices can include any of the devices described above with respect to FIG. 1, as well as a number of other devices. A device can be a battery-powered device even if it receives a portion of its power from a non-battery source (e.g., from an AC source).

Figure 2A:
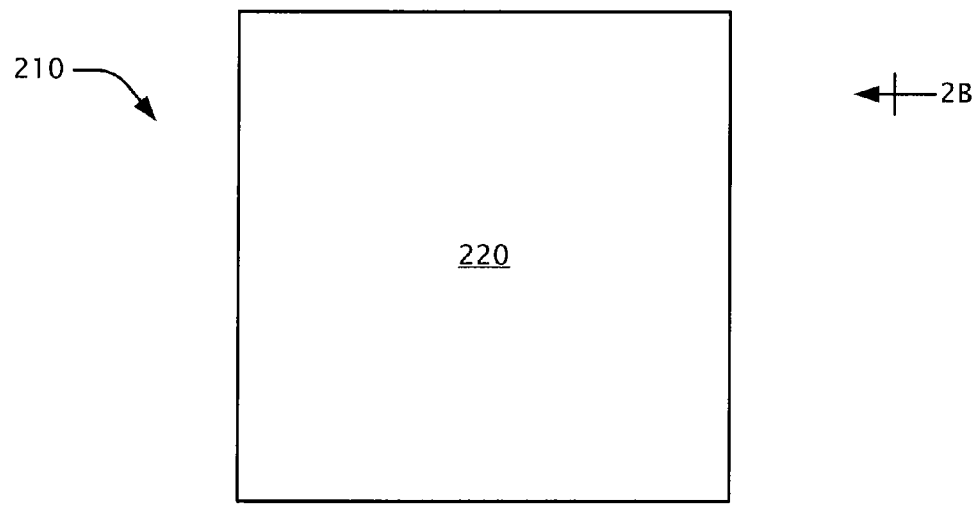
FIGS. 2A-2C show views of an exemplary embodiment of a battery.
Figure 2B:
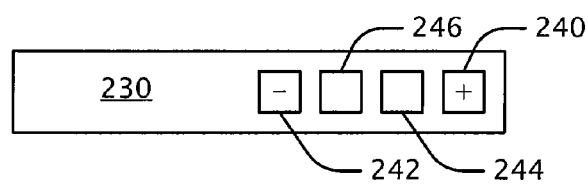

FIG. 2A shows a plan view of an exemplary embodiment of a battery 210. The battery 210 comprises a top surface 220. FIG. 2B shows a side view of the battery 210. A side surface 230 features a plurality of contacts, including power contacts and one or more signal contacts. For example, the depicted embodiments shows a positive contact 240, a negative contact 242 and signal contacts 244, 246. The signal contacts 244, 246 are configurable to provide information signals to a battery-powered device. For example, these information signals can include battery capacity information (e.g., how much power remains in the battery 210), temperature information for the battery 210 (e.g., for a thermal protection circuit), power consumption information (e.g., time-to-empty information), battery identity information (e.g., manufacturer and/or model information), state-of-charge information, voltage information, current information and other status information. In some embodiments this information is provided by the battery 210 using a High-Speed DQ (HDQ) serial interface, I$^2$C serial interface or other interface. The information can be calculated at least in part by one or more circuits coupled to the battery 210 (e.g., inside of or on the battery 210), which can consume power stored in the battery. One example of such a circuit is any of the bqJUNIOR series of integrated circuits from Texas Instruments Inc.

Figure 2C:
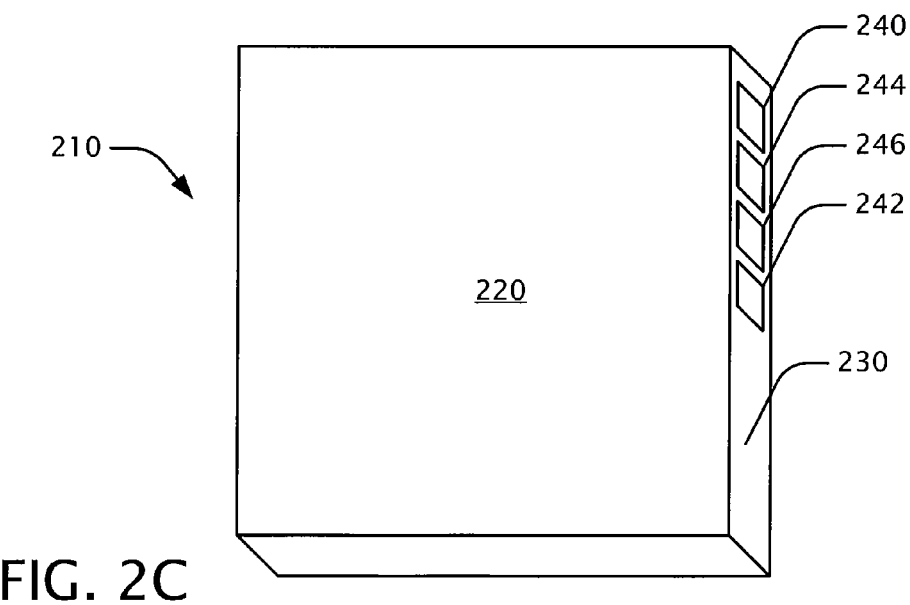

In particular embodiments, contacts appear on multiple surfaces of a battery. Some batteries have one or more contacts at least partly recessed into, at least partly raised above, and/or at least partly flush with one or more battery surfaces. An area on the side surface 230 into which a contact is recessed is sometimes called a "battery well" (not shown). Generally, contacts are also sometimes referred to herein as "terminals." FIG. 2C shows a perspective view of the battery 210.

Figure 3:
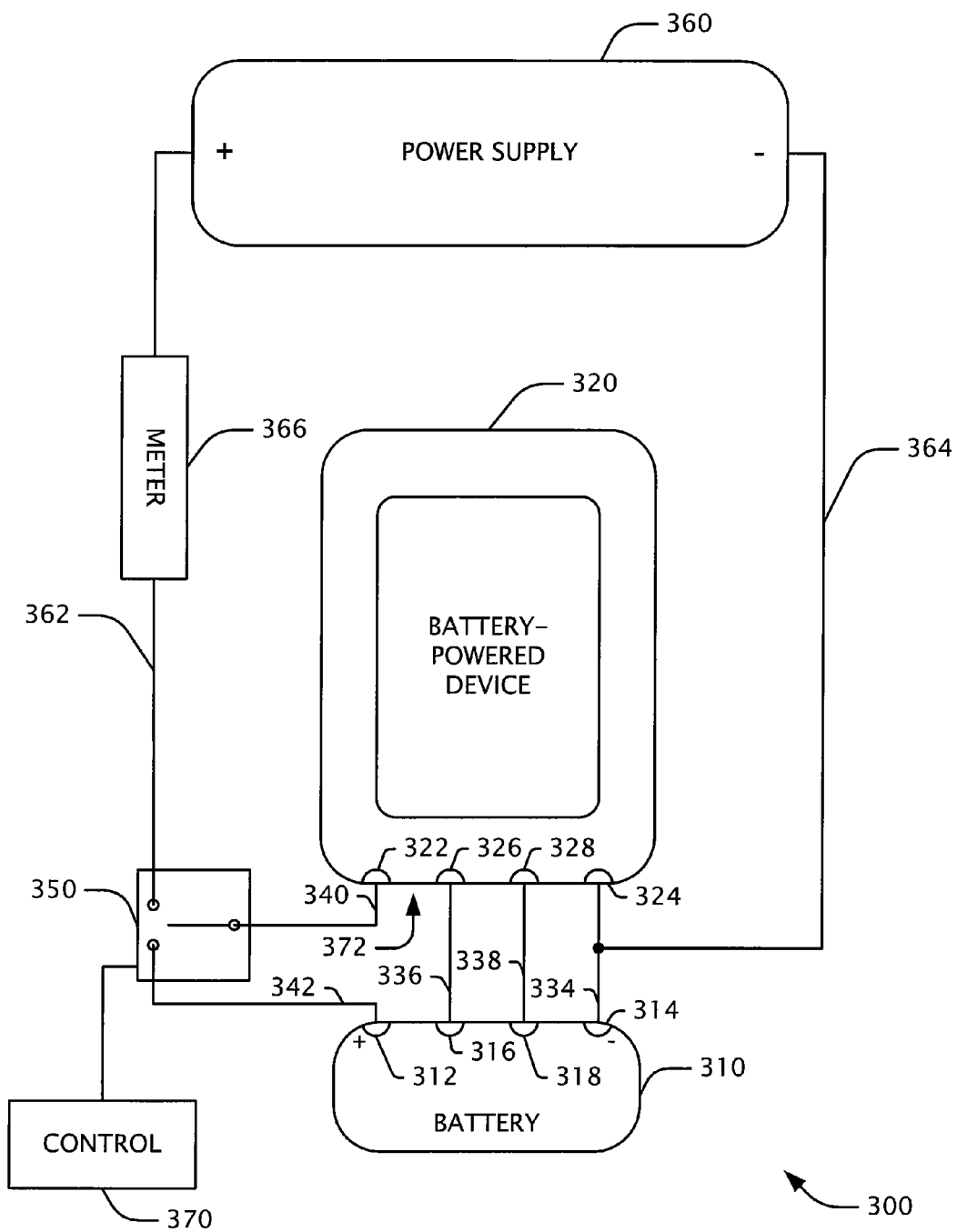
FIG. 3 shows an exemplary embodiment of an apparatus for coupling a battery and an external power supply to a battery-powered device.

FIG. 3 shows an exemplary embodiment of an apparatus 300 for coupling a battery 310 (or more than one battery) to a battery-powered device 320. The battery comprises a positive voltage contact 312, a negative voltage contact 314, and one or more signal contacts 316, 318. The apparatus 300 is sometimes called a "battery bypass," though this name should not be used to limit the elements of the apparatus 300.

The battery contacts 312, 314, 316, 318 have corresponding contacts 322, 324, 326, 328 on the battery-powered device 320, thus forming respective contact pairs. Generally, the battery 310 and a battery receiving surface 372 on the device 320 are designed to be mechanically coupled together such that the battery contacts 312, 314, 316, 318 are electrically coupled to their respective counterpart contacts 322, 324, 326, 328. However, in some embodiments the contacts on the battery 310 do not all have a corresponding contact on the battery-powered device 320. In further embodiments, the contacts on the device 320 do not all have a corresponding contact on the battery 310.

For the apparatus 300, the contacts of at least one of the respective contact pairs are electrically coupled to each other using one or more connectors. For example, in the depicted embodiment, connector 336 couples contacts 316, 326, connector 338 couples contacts 318, 328, and connector 334 couples contacts 314, 324. The connectors are generally comprised of one or more conductive materials. In some configurations, the contacts 312, 322 are respectively coupled to connectors 340, 342, which in turn are connected to a switch 350. The switch 350 can couple, for example, the VDD (+) terminal of a power supply 360 to the device contact 322 through the connector 362 and the connector 340. Generally, the power supply 360 provides a DC voltage approximately equal to that provided by the battery 310 during the battery's normal operation. In some embodiments, the power supply 360 provides 4.2 VDC, but in further embodiments the supply 360 can provide one or more other voltages. The switch 350 can also couple the battery contact 312 to the positive device contact 322 through the connectors 340, 342. This prevents the power supply 360 from powering the device 320 and allows the device 320 to charge the battery 310 and/or consume power from the battery 310. Power for charging the battery 310 can be provided to the device 320 through, for example, a USB port or one or more other ports on the device 320.

In some embodiments the switch 350 switches according to a manual input; in further embodiments, it changes in response to a signal from a control unit 370. The control unit 370 comprises a circuit or programmed computer. In some cases, the control unit 370 is configured to change the switch 350 and cause the battery 310 to be charged in response to one or more determinations (e.g., a determination that a certain point in time has been reached, a determination that the capacity of the battery 310 has reached a certain point). Accordingly, the apparatus 300 can be used to charge the battery 310 as needed (e.g., after a certain amount of testing of the device 320 has occurred).

In further embodiments, the switch 350 is omitted, and the VDD terminal of the power supply 360 is coupled to the device contact 322 using the connectors 340, 362.

The negative (−) terminal of the power supply 360 is coupled to the battery contact 314 and the device contact 324 through a connector 364 and the connector 334. This provides the battery 310 and the device 320 with a common reference voltage. In at least some cases, this is needed for proper operation of one or more circuits providing information to the device 320 through the contacts 316, 318. Further embodiments instead provide a common reference voltage through one or more other pairs of contacts on the device 320 and the battery 310 (e.g., through positive contacts).

When the VDD terminal of the power supply 360 is coupled to the contact 322 of the device 320, and when the negative terminal of the power supply 360 is coupled to the contact 324 of the device 320, the device 320 can be powered by the power supply 360 instead of by the battery 310 (e.g., in place of the battery 310). The connectors 336, 338 allow the battery 310 and the device 320 to exchange information even though the battery 310 is not powering the device 320. Thus, the device 320 can be operated with less regard for the capacity of battery 310 (e.g., the device 320 can be operated longer than if it were being powered by the battery 310). However, since the connectors 316, 318 still allow information to be exchanged between the battery 310 and the device 320 (e.g., battery capacity information, battery temperature information), the device 320 can still act as if a battery is attached as in normal operation. For example, if the device 320 is configured to turn on only if it can receive battery capacity information from the battery 310, the apparatus 300 can help satisfy this requirement even if the battery 310 is not powering the device 320.

In some embodiments, the apparatus 300 further comprises a meter 366 (e.g., an ammeter) that is coupled to the device 320 (e.g., between the power supply 360 and the switch 350). The meter 366 can measure power consumed by the device 320 in embodiments with the power supply 360. The meter 366 can be incorporated into the power supply 360, which in some cases allows for more accurate measurement of current drawn by the device 320 and more accurate provision of the voltage needed by the device 320.

Figure 4:
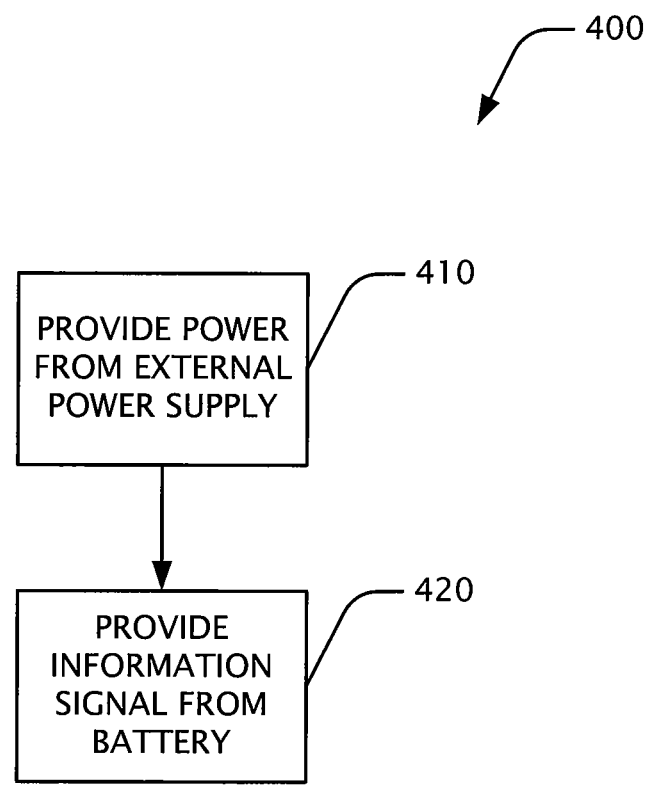
FIG. 4 shows a flowchart of an exemplary embodiment of a method for coupling a battery and an external power supply to a battery-powered device.

FIG. 4 shows a flowchart of an exemplary embodiment of a method 400 for coupling a battery and an external power supply to a battery-powered device. In a method act 410, power is provided to the battery-powered device from the external power supply instead of from the battery. In a method act 420, one or more battery information signals are provided to the battery-powered device from the battery.

Figure 5:
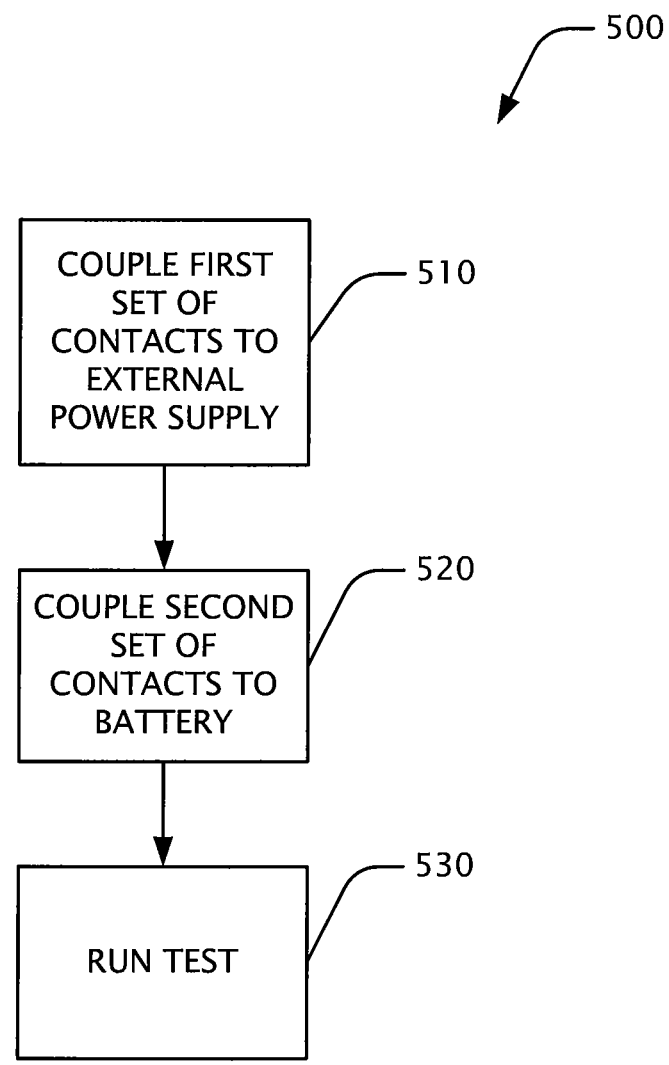
FIG. 5 shows a flowchart of another exemplary embodiment of a method for coupling a battery and an external power supply to a battery-powered device.

FIG. 5 shows a flowchart of an exemplary embodiment of a method 500 for coupling a battery and an external power supply to a battery-powered device. In a method act 510, a first set of one or more contacts on the battery-powered device is coupled to one or more contacts on the external power supply. This coupling takes the place of one or more connections to the battery. In a method act 520, a second set of one or more contacts on the battery-powered device is coupled to one or more contacts on the battery. The contacts on the battery provide one or more information signals to the device. In further embodiments, in a method act 530 one or more tests are performed on the battery-powered device while it is powered by the external power supply.

The methods 400, 500 can be performed using, for example, an apparatus such as the apparatus 300, and using one or more other apparatus described herein.

Figure 6A:
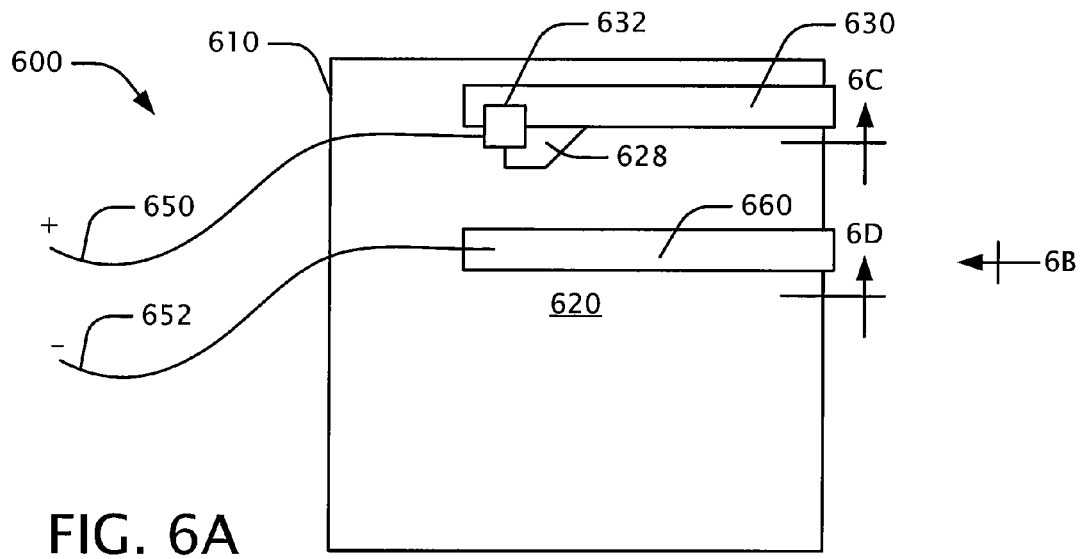
FIGS. 6A-6D show views of a battery with an exemplary embodiment of a battery apparatus.

FIG. 6A shows a plan view of an exemplary embodiment of a battery apparatus 600 coupled to a battery 610. The battery 610 is similar to the battery 210, but other embodiments can use different batteries. The apparatus 600 comprises a conductor 630 and a conductor 660. The conductor 630 is coupled to a positive connector 650, either directly or through an intermediary (e.g., a switch 632). The conductor 660 is coupled to a negative connector 652. The connectors 650, 652 can be coupled to a power supply (not shown), similar to the connectors 362, 364 of FIG. 3, described above. The conductors 630, 660 are depicted here as running at least partly along the battery's top surface 620, but in other embodiments at least one conductor runs at least partly along another battery surface or along no battery surface. In some embodiments, the conductors 630, 660 have one or more shapes other than those disclosed herein.

Figure 6B:
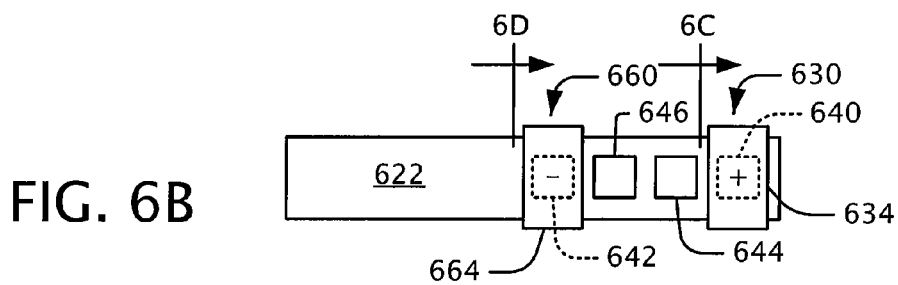

FIG. 6B shows a side view of the battery 610, with a side surface 622 featuring a positive contact 640, a negative contact 642, and signal contacts 644, 646. (For clarity, the switch 632 and the connectors 650, 652 are omitted from this view.) A portion 634 of the conductor 630 covers at least part of the positive contact 640. A portion 664 of the conductor 660 covers at least part of the negative contact 642. The amounts of the contacts 640, 642 that are covered by their respective conductor portions 634, 664 can vary. Generally, the conductor portions 634, 664 are configured such that corresponding, receiving contacts on a battery-powered device are, upon mechanically coupling the battery 610 to the device, electrically coupled to their respective conductor portions instead of to the contacts 640, 642. In further embodiments, at least one of the conductor portions 634, 664 serves as an intermediate coupler between at least one of the contacts 640, 642 and one or more corresponding receiving contacts on the battery-powered device. In at least some cases, the signal contacts 644, 646 remain generally exposed for coupling to corresponding contacts on the battery-powered device.

In the depicted embodiment, the conductor portions 634, 664 are shown as extending along the battery side surface 622 and onto the bottom surface of the battery 610. In further embodiments, one or more of the conductor portions 634, 664 have other lengths and/or shapes than those disclosed herein.

Figure 6C:
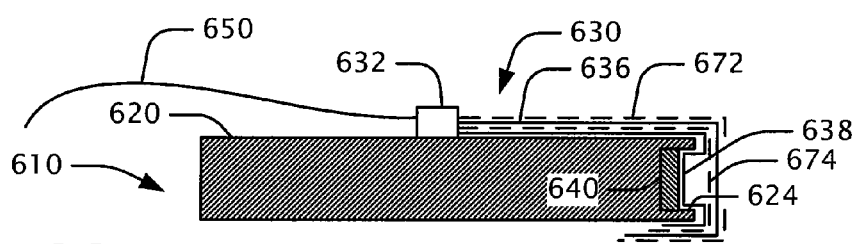

FIG. 6C shows a cross-sectional view of the apparatus 600 along the lines indicted in FIGS. 6A and 6B. This view shows an exemplary embodiment of the conductor 630. The conductor 630 comprises a sub-conductor 636, which extends along the battery top surface 620 and traverses the side surface 622, partially or fully covering the contact 640. In this view, the contact 640 is shown as being recessed into a battery well 624. The sub-conductor 636 (sometimes called "top positive") is configured to couple to a corresponding contact on the battery-powered device and to prevent the contact 640 from directly coupling to the device. The sub-conductor 636 is electrically insulated from the contact 640 by being spaced apart from the contact and/or by a layer of insulating material 674 (shown as a dashed line). The insulating material 674 can comprise, for example, Kapton® and/or one or more other materials.

In additional embodiments, the conductor 630 also comprises a sub-conductor 638, which extends along the battery top surface 620 and traverses the side surface 622, partially or fully covering the contact 640, thus coupling with the contact 640. In some cases, at least a portion of the sub-conductor 638 is between the sub-conductor 636 and the battery top surface 620. The sub-conductors 636, 638 are coupled to the switch 632. This can allow for electrically coupling the connector 650 to the coupled battery-powered device through the sub-conductor 636 (e.g., for powering the device using the power supply), or for coupling the sub-conductors 636, 638 to each other (e.g., for powering the device using the battery 610), according to the position of the switch 632.

Returning briefly to FIG. 6A, in some embodiments the sub-conductor 638 is coupled to the switch 632 by a flap 628 that protrudes from beneath the sub-conductor 636 on the battery top surface 620. Electrically, the flap 628 forms an extension of the sub-conductor 638. In some cases, the sub-conductor 638 and the flap 628 are formed from one piece of material, while in other cases they are separate pieces of material that are coupled together. Together, the flap 628 and the sub-conductor 638 (sometimes called "battery positive" or "bottom positive") aid in powering the device with the battery 610, according to the position of the switch 632.

Figure 6D:
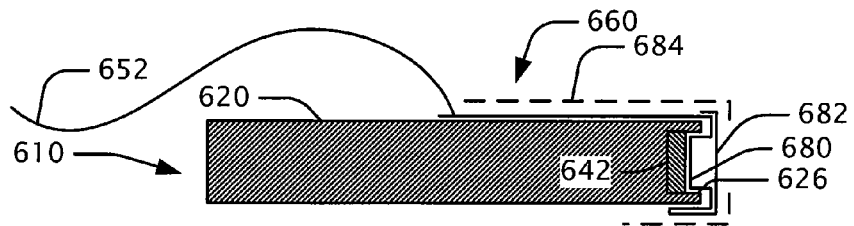

FIG. 6D shows a cross-sectional view of the apparatus 600 along the line indicated in FIGS. 6A and 6B. This view shows an exemplary embodiment of the conductor 660. The conductor 660 comprises a sub-conductor 680 coupled in series with a sub-conductor 682. The sub-conductor 680 extends along the battery top surface 620 and traverses the side surface 622, partially or fully covering the contact 642, which is shown here as being recessed into a battery well 626. The sub-conductor 680 couples with the contact 642. The sub-conductor 682 extends from the bottom surface of the battery 610 to the top surface 620, outwardly exposing a conductive surface relative to the side surface 622. In the depicted configuration, the sub-conductors 680, 682 are connected in series (e.g., they double-back on each other). Thus, the sub-conductor 680 is configured to be coupled to the battery-powered device. This can allow for simultaneously coupling both the contact 642 and the battery-powered device to a power supply through the connector 652. Such a configuration can provide a common reference voltage to the battery and the device.

In the embodiments of FIGS. 6C and 6D, the conductors 630, 660 further comprise additional insulating portions 672, 684, respectively, as indicated by dashed lines. These insulating portions insulate external surfaces of the conductors 630, 660.

The sub-conductors described above can comprise one or more conductive materials. In some embodiments, a conductive film, such as a metallic tape (e.g., a copper tape) is used. Copper provides a relatively low resistance that mimics the low resistance of gold, which is often used in battery contacts. The metallic tape can comprise a conductive side and an opposing insulating side. The conductive materials can be chosen such that they are thin compared to dimensions of the battery 610. In some cases, the conductors 630, 660 are thin enough that the apparatus 600 does not interfere with the battery 610 being mechanically coupled to a battery-powered device, as in the battery's normal use. The apparatus 600 can also be configured to be removably attached to the battery 610, such that the apparatus 600 can be separated from the battery 610 when needed. In some cases, the apparatus 600 can be adapted for different battery models.

In some cases, the conductors 630, 660 are configured to provide selected impedances between the connectors 650, 652 and the battery contacts 640, 642 or the device contacts. An example target impedance is about 50 mΩ, though a target impedance can vary among different devices. To obtain a target impedance, the apparatus 600 can be constructed such that the total length of the connector 650 plus the conductor 630 (and/or the total length of the connector 652 plus the conductor 660) is, for example, less than 8 inches, less than 12 inches, or less than another length.

If the conductors are too long or the cross-section of the conductors is too small, the resulting resistance can negatively impact the operation of the battery. As a result, the battery-powered device will, in some cases, perceive a problem with the battery and fail to operate properly. For example, the device can fail to power-on, fail to stay powered-on once the operating system loads, fail to charge the battery, and/or provide false "low battery" indications to the operating system.

Figure 7:
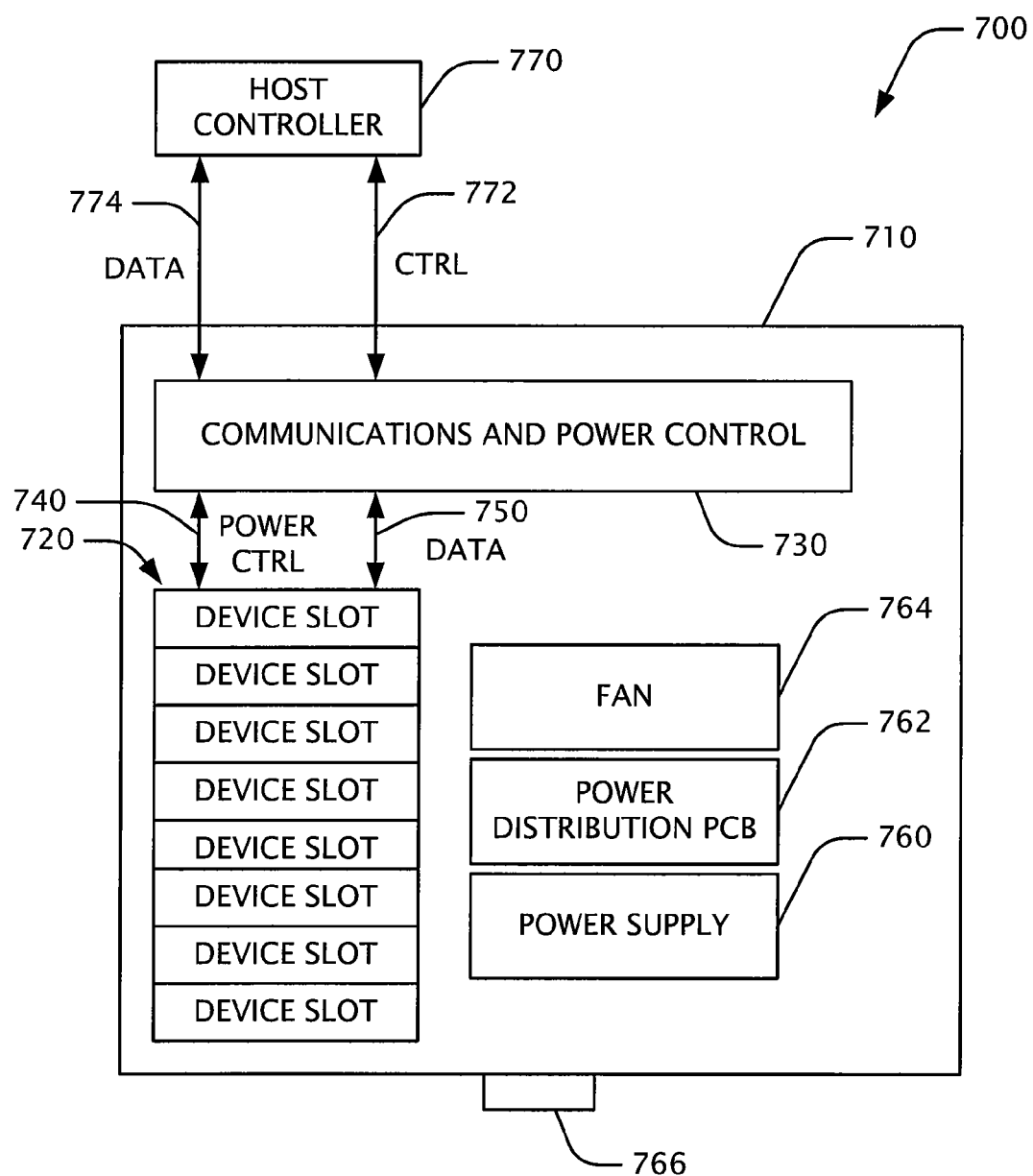
FIG. 7 shows a block diagram of an exemplary embodiment of a hardware control system.

FIG. 7 shows a block diagram of an exemplary embodiment of a hardware control system 700. One or more components of the system 700 are at least partially contained in a container 710. In some cases the container 710 comprises a chassis (e.g., a 2U chassis or other chassis design, modified or unmodified). The container 710 is sometimes selected for a particular footprint or overall size (e.g., a compact size). One or more device slots 720 are configured to be coupled to one or more electronic devices. In various embodiments, the slots 720 comprise one or more types of data and/or power connectors (e.g., USB, Mini-USB, Micro-USB, Ethernet, Firewire, or other types). In some embodiments, the device slots 720 are positioned relative to the container 710 such that an electronic device coupled to one or more of the device slots 720 is at least partially within the container 710. The container 710 can be configured to at least partially hide from view one or more devices coupled to the device slots 720.

The system 700 further comprises a communications and power control component 730 coupled to the device slots 720. The communications and power control component 730 controls power provided to an electronic device coupled to one or more of the slots 720 using one or more power control lines 740. The component 730 also controls data sent to and/or received from the electronic device using one or more data lines 750. The communications and power control component 730 is described in more detail below.

In some cases, the system 700 further comprises one or more power supplies 760. The one or more power supplies 760 can provide power at one or more voltages (e.g., 4.2 VDC, 12 VDC). Input voltage for the power supplies 760 can be one or more voltages (e.g., 115 VAC, 208 VAC). The system 700 can also comprise one or more power distribution printed circuit boards (PCBs) 762, one or more cooling fans 764, and one or more power switches 766.

The communications and power control component 730 is coupleable to a host controller 770, which can be inside or outside of the container 710. The host controller 770 provides control information to the communications and power control component 730 through one or more control lines 772. Control information exchanged using the control lines 772 can include, for example, one or more signals for powering or operating one or more devices coupled to the device slots 720. The one or more signals can be used to control an apparatus such as any of the apparatus 300, 600 described above.

The host controller 770 also exchanges data with the component 730 using one or more data lines 774. Data exchanged using the data lines 774 can include, for example, data sent to or received from device(s) coupled to the device slots 720. Such data can be used to monitor one or more conditions on the device(s) and/or perform one or more tests on the device(s), including debugging operations. In at least some cases, data traveling along the data lines 774 between the host controller 770 and the device(s) passes through the communications and power control component 730 unchanged.

The control lines 772 and data lines 774 can utilize one or more protocols and interfaces to transmit data serially or in parallel. In one embodiment, an RS-232 interface is used for the control lines 772 and a USB interface is used for the data lines 774.

The system 700 is generally scalable. In further embodiments, multiple instances of one or more components shown in FIG. 7 are used to provide a system for automated simultaneous or near-simultaneous testing of electronic devices (e.g., battery-powered devices, hard drives, and/or other devices). The testing can comprise, for example, copying data onto the electronic devices, running one or more tests, retrieving test results from the devices, turning devices on and/or off, and connecting and/or disconnecting data connections on the devices (e.g., connections to one or more other components, such as a personal computer). The tests can be run any number of times for any time period, often with little or no human intervention. Depending on the configuration of the system 700, it can be used to compactly perform large-scale, automated device testing. The system 700 can be constructed modularly so that various components can be easily added or removed.

One embodiment of the system 700 comprises: two banks of eight device slots each (sixteen device slots total); one 12 VDC power supply; three 4.2 VDC power supplies; four 12 VDC fans; one 12 VDC power distribution PCB; one AC power switch and one AC line-in, both coupled to the power supplies; two host controllers; and four communications and power control components, two each of the control components coupled to one bank of device slots and one host controller.

Further embodiments of the system 700 comprise one or more antennas, which can be used to conduct wireless signal testing (e.g., cellular testing, Bluetooth testing, WiFi testing) with devices coupled to the system 700.

Figure 8:
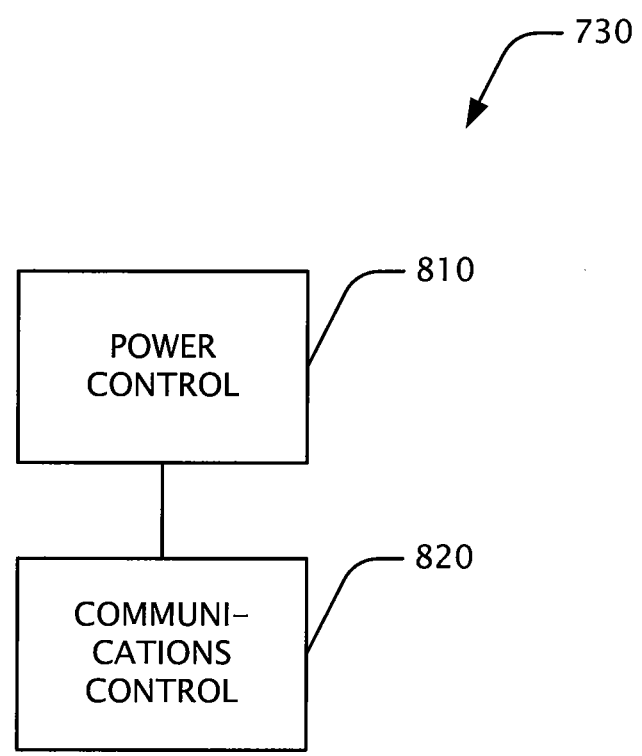
FIG. 8 shows a block diagram of an exemplary embodiment of communications and power control components.

FIG. 8 shows a block diagram of an embodiment of the communications and power control component 730 described above. The embodiment comprises a power control component 810 and a communications control component 820. In some embodiments, the components 810, 820 are on one circuit board. In further embodiments, the components 810, 820 are fabricated on separate circuit boards and connected with a cable or other connector. The communications control component 820 can be constructed as an add-on board to the power control component 810, in which case the components 810, 820 can be connected with, for example, an intra-board jumper.

The component 810 allows for controlling and/or measuring voltages on N ports, either individually or in groups of two or more ports. In some embodiments, the ports can be controlled manually or programmatically, and/or sequentially or simultaneously.

Figure 9:
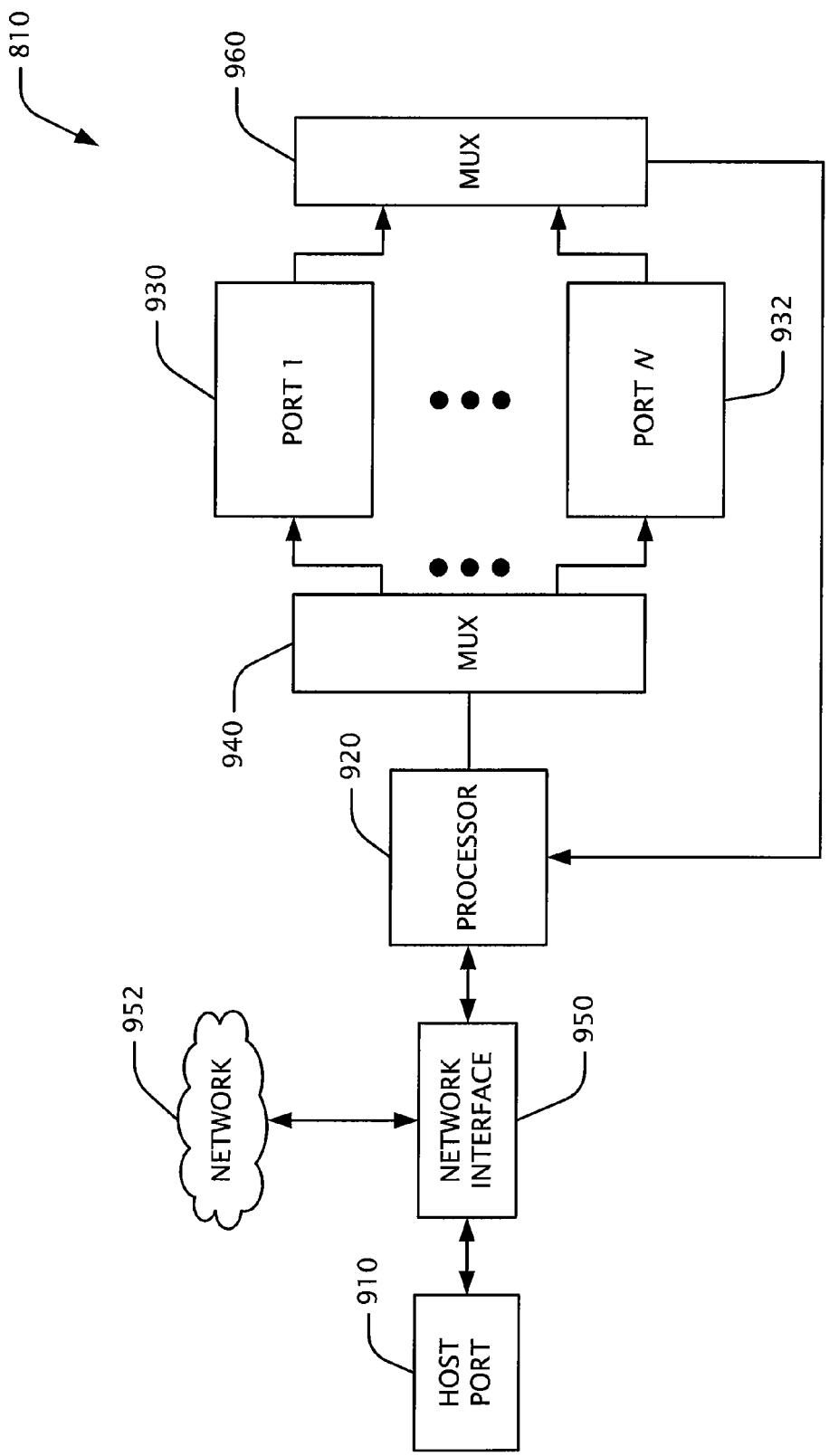
FIG. 9 shows a block diagram of an exemplary embodiment of a power control component.

FIG. 9 shows a block diagram of an exemplary embodiment of the power control component 810. A host port 910 exchanges data with the host controller 770, described above. Various types of ports can be used for the host port 910 (e.g., serial port, parallel port, USB port). Commands received from the host controller 770 are sent from the host port 910 to a processor 920. Exemplary commands sent by the host controller can include commands for the processor 920 itself and/or commands for one or more of N ports 930, 932. The processor 920 sends instructions to one or more of the ports 930, 932. Each of the ports 930, 932 allows for controlling the power provided to one or more devices coupled to the device slots 720. In some embodiments, each of the ports 930, 932 is coupled to an apparatus like the apparatus 300, 600 described above. The instructions can be routed to the ports 930, 932 through a multiplexer 940. In embodiments where data is received from the ports 930, 932, this data can be sent to the processor 920, possibly through a multiplexer 960.

In some cases, multiple instances of the control component 810 are coupled together through respective instances of a network interface 950 and through a network 952. The network interface 950 can comprise, for example, an RS-485 serial link or other interface. The interface 950 can be used to share a single host port 910 among several instances of the control component 810.

In at least some embodiments, the control component 810 offers an extensible way to programmatically control multiple devices from a single port (e.g., from a single serial or parallel port). The extensibility stems, at least in part, from the network interface 950.

Figure 10:
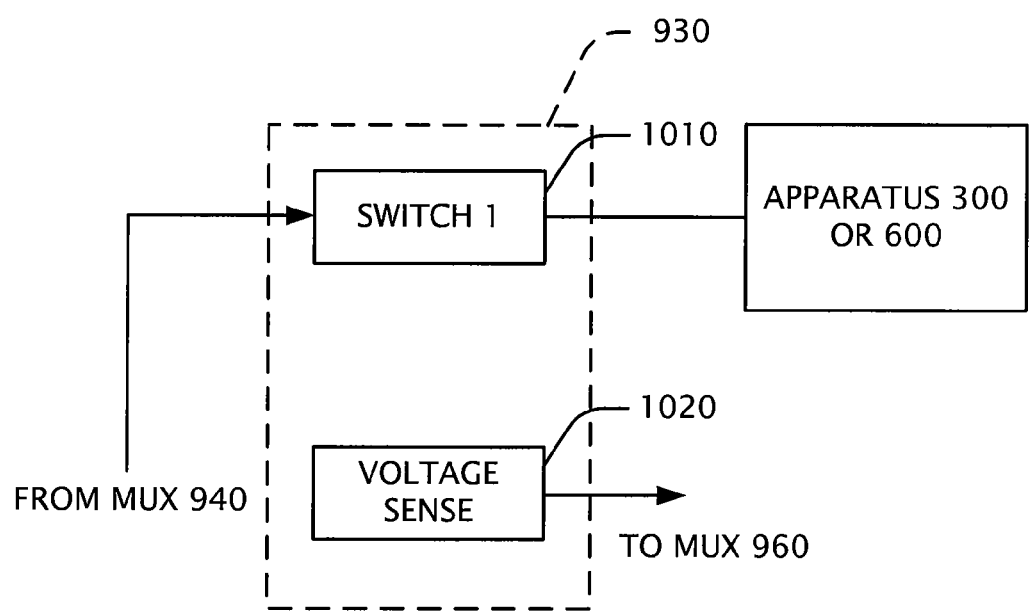
FIG. 10 shows a block diagram of an exemplary embodiment of a port in a power control component.

FIG. 10 shows a block diagram of an exemplary embodiment of the port 930 (or any of the N ports of FIG. 9). The port 930 comprises one or more switches 1010 configured to receive one or more signals from the multiplexer 940. The switch 1010 can comprise, for example, one or more latching relays and/or other types of switches. In some embodiments the port 930 also comprises a voltage sense component 1020 configurable to determine a state of a device coupled to the port 930 (e.g., whether the device is powered on or not) and provide that information to the multiplexer 960. One or more of the components shown in FIG. 10 can be controlled using commands from the processor 920.

Returning briefly to FIG. 8, the communications control component 820 can be used to enable or disable one or more data connectors. For example, the component 820 can disable a USB connector coupled to an electronic device. As used in this application, including in the claims, the terms "connector" or "data connector" refer to both data connector plugs and receptacles (e.g., both male and female connectors). Since a plug and a receptacle for a given connector type often have similar operating principles despite different physical constructions, the disclosed technologies are generally applicable to both connector plugs and receptacles. Some embodiments herein may refer to, for example, an interaction between a "connector" and a corresponding "port," but these examples are not limiting.

Figure 11:
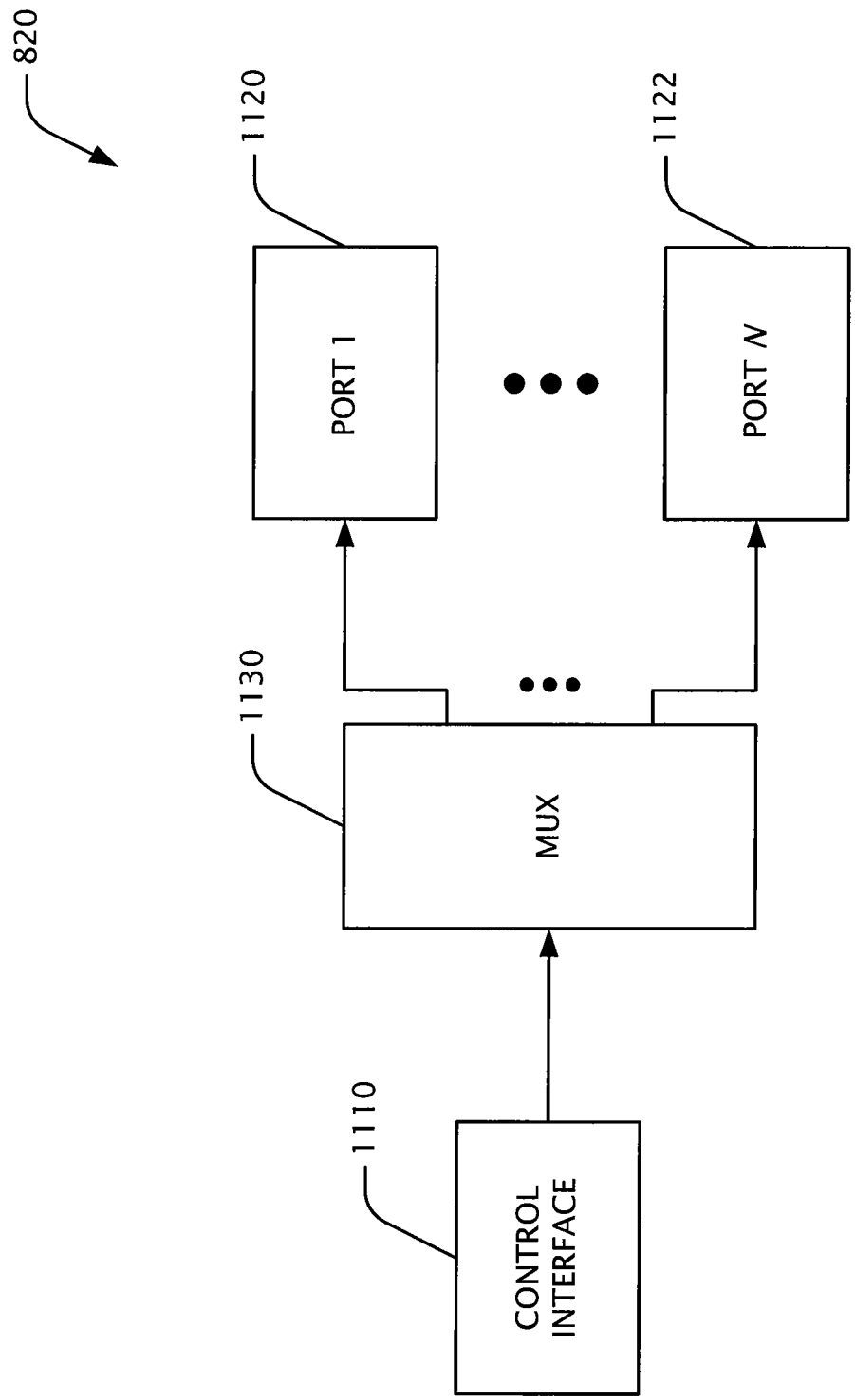
FIG. 11 shows a block diagram of an exemplary embodiment of a communications control component.

FIG. 11 shows a block diagram of an exemplary embodiment of the communications control component 820. The component 820 receives commands through a control interface 1110. In at least some cases, the control interface 1110 receives the commands through the power control component 810. The control interface 1110 sends the commands to one or more of N ports 1120, 1122. The ports 1120, 1122 are coupleable to one or more electronic devices. For example, the ports 1120, 1122 can be coupled to devices connected to the device slots 720. One or more of the ports 1120, 1122 can be used simultaneously.

Figure 12:
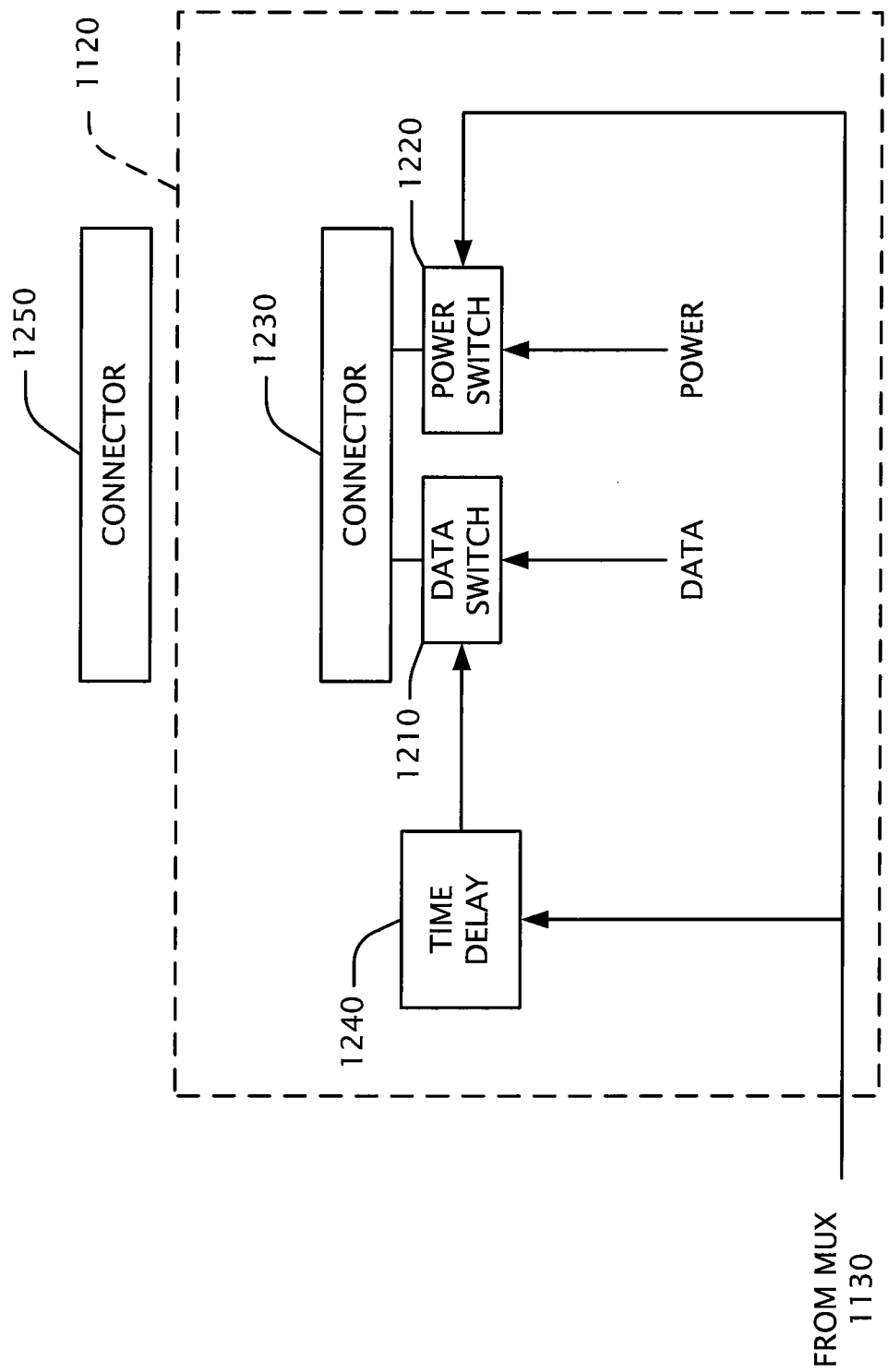
FIG. 12 shows a block diagram of an exemplary embodiment of a port in a communications control component.

FIG. 12 shows a block diagram of an exemplary embodiment of the port 1120 (or any of the N ports of FIG. 11). The port 1120 comprises a data switch 1210 and a power switch 1220. The switches 1210, 1220 are coupled to one or more connectors 1230. The switches can comprise, for example, a solid state switch, a latching relay and/or one or more other types of switches. The switches 1210, 1220 control the flow of power and data signals to the connector 1230. In some embodiments the connector 1230 is part of the port 1120, while in further embodiments it is integrated into another component to which the connector 1230 is coupled. For example, the connector 1230 can be part of one or more of the device slots 720. The connector 1230 is configured to couple mechanically and electrically to a corresponding connector 1250. The connectors 1230, 1250 can comprise, for example, USB connectors, Ethernet connectors, Firewire connectors, or one of many other types of connectors. Further embodiments can comprise additional switches directed to different subsets of power and/or data signals of the connector 1230.

The port 1120 is configurable to provide independent control of the flow of power and data signals to the connector 1230. In some embodiments, the data switch 1210 and the power switch 1220 can be activated at the same time to simultaneously provide their respective signals to the connector 1230. In further embodiments, the switches 1210, 1220 can be activated at different times to, for example, provide a data signal at one time and a power signal at another time. Different activation times can be provided by using separate control signals for each of the switches 1210, 1220. However, in the embodiment of FIG. 12, a control signal from the multiplexer 1130 is provided to the power switch 1220, and a delayed version of the same control signal is provided to the data switch 1210 through a time delay circuit 1240. In further embodiments, the delay circuit 1240 can be configured to delay the control signal to the power switch 1220, instead. Generally, the delay can be fixed or variable (e.g., variable according to a pattern, variable according to one or more user inputs, variable according to a time constraint). In some cases, the connector 1230 can act as an "ON/OFF" switch for the corresponding connector 1250 to which the connector 1230 is coupled.

Figure 13:
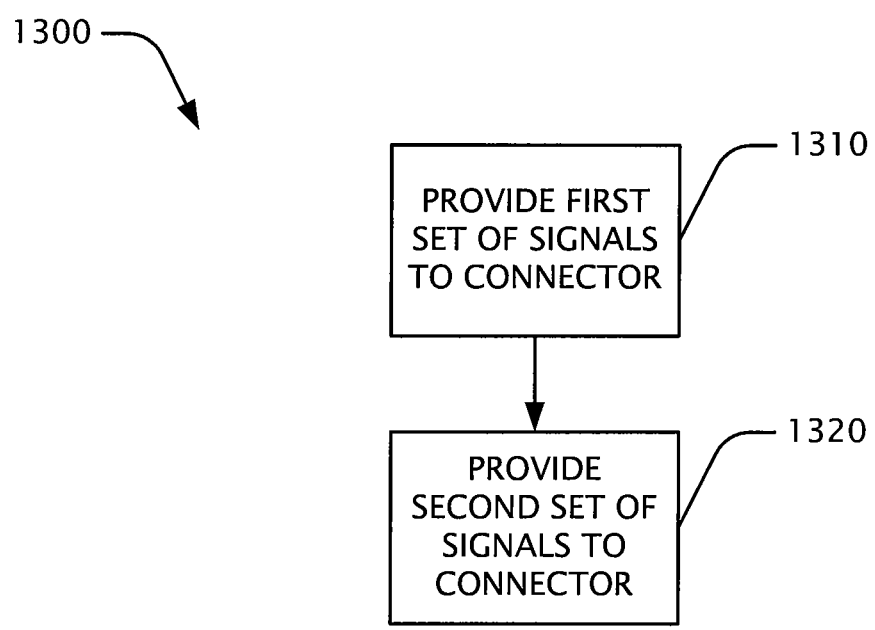
FIG. 13 shows a flowchart of an exemplary method for using a port in a communications control component.

FIG. 13 shows a flowchart of an exemplary method 1300 for using the port 1120. In a method act 1310, a first set of one or more signals is provided to a data connector (e.g., connector 1230). The first set of one or more signals includes one or more signals that simulate one or more data connector power signals being transmitted from a data connector to a corresponding data connector. In a method act 1320, a second set of one or more signals is provided to the data connector, the second set of one or more signals simulating one or more data connector data signals being transmitted from the data connector to the corresponding data connector. The second set of signals is provided after a delay following the providing of the first set of one or more signals.

In some cases, the port 1120 can be used with a method like the method 1300 to simulate the interaction of a connector with a corresponding connector. For example, it can mimic the insertion of a USB connector into a USB port (e.g., in cases where the USB connector is already positioned in the USB port but no signals are being sent to the port through the connector). Because of the design of a USB connector, when the USB connector is inserted into the USB port the connector first receives VCC and ground signals and then, moments later, two data signals (D+ and D−). The delay between the two types of signals can, for example, allow for re-initializing and resetting the USB connector before the data signals are activated. Simultaneously activating the power signals and the data signals will often introduce noise into the connection between the USB connector and the USB port. To properly simulate the insertion of the USB connector into the USB port, the port 1120 is used to first activate the USB port's VCC and ground signals and then the USB port's data signals.

Such capabilities can be useful in testing devices that have a connector. For example, the functioning of a USB port on an electronic device can be tested using scenarios involving the insertion of a USB cable into the USB port (or the removal of the cable from the port) without having to physically insert or remove the cable during the testing. Effects of inserting the USB cable at varying speeds can be examined by varying the delay provided by the delay circuit 1240. In some cases, the delay is approximately 50 ms. Generally, the delay is less than 1 s, though any length of delay can be used.

Figure 14:
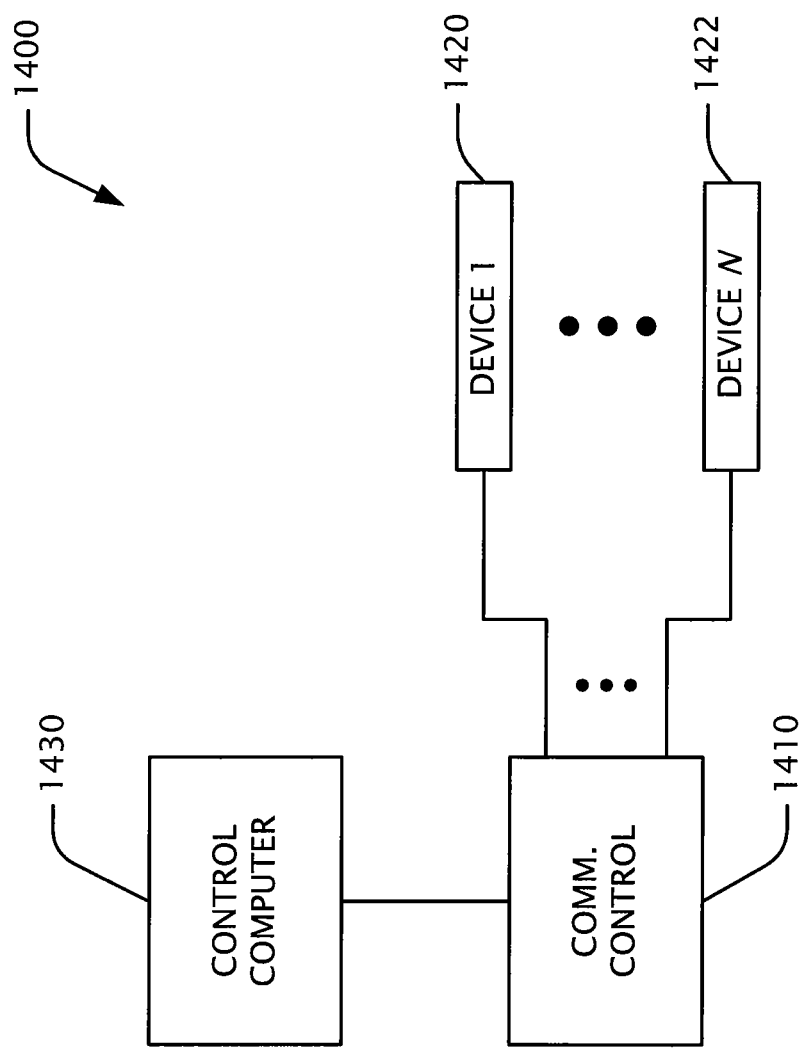
FIG. 14 shows a block diagram of an exemplary embodiment of a system for controlling one or more electronic devices.

FIG. 14 shows a block diagram of an exemplary embodiment of a system 1400 for controlling one or more electronic devices. A communications control component 1410 (similar to the communications control component 820, described above) is coupled to one or more electronic devices 1420, 1422. The control component 1410 is configured to activate or deactivate respective connectors (not shown) to which the devices 1420, 1422 are connected. The control component 1410 can receive commands from a control computer 1430 as to which of the devices 1420, 1422 are to have their respective connectors enabled or disabled.

The electronic devices 1420, 1422 can comprise, for example, battery-powered electronic devices, computer components and/or peripherals, manufacturing equipment, and other devices.

Figure 15:
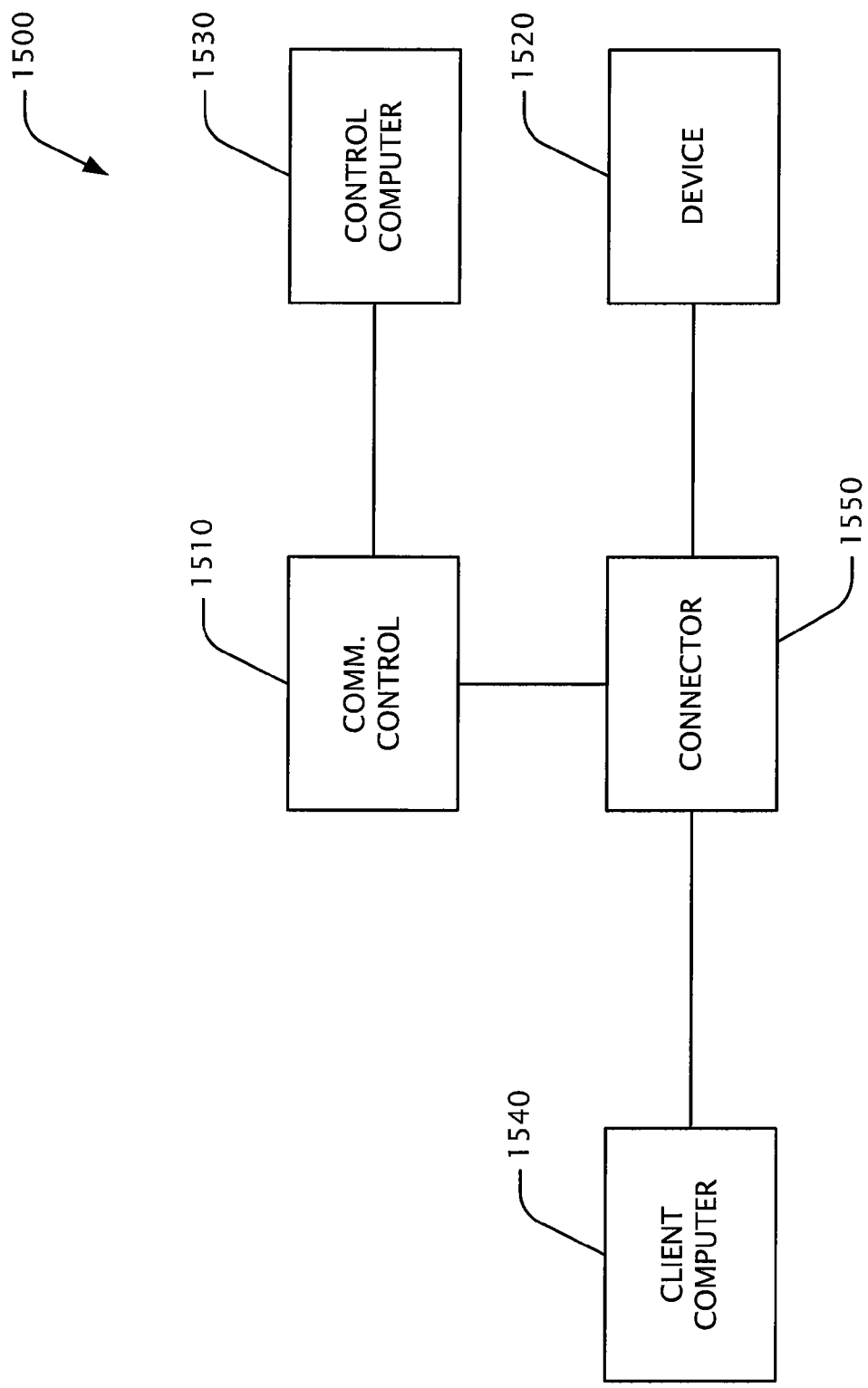
FIG. 15 shows a block diagram of an exemplary embodiment of a system for controlling access to one or more electronic devices.

FIG. 15 shows a block diagram of an exemplary embodiment of a system 1500 for controlling access to one or more electronic devices. The system 1500 comprises a communications control component 1510 (like the communications control component 820, described above) coupled to one or more connectors 1550 (e.g., USB ports, Ethernet ports, or one or more other ports). The connectors 1550 are coupled to one or more electronic devices 1520. In many cases, the device 1520 comprises a data storage device or one or more other devices to which access by a user or computer is to be controlled. The connectors 1550 are coupled to one or more client computers 1540, which are configurable to access the electronic devices 1520 through the connectors 1550.

In response to one or more commands (e.g., a security command) from a control computer 1530, the communications control component 1510 can activate or deactivate one or more of the connectors 1550. The client computers 1540 cannot access the device 1520 when the corresponding connector 1550 is deactivated. Thus, the system 1500 can be used to control a client computer's access to an electronic device according to one or more security determinations (e.g., identification of valid access credentials and/or a valid access timeframe).

This system is potentially more secure than, for example, connecting an electronic device to the USB port of a client computer and enabling or disabling the USB port with a software instruction. In many cases, it is possible to reactivate a USB port or other port that has been disabled by software if the client computer can be accessed. The system 1500, however, is not necessarily affected by commands from the client computer 1540 and is thus more secure.

In view of the many possible embodiments to which the principles of the disclosed technologies may be applied, it should be recognized that the illustrated embodiments are only examples of the disclosed technologies and should not be taken as limiting the scope of the invention. Rather, the scope of the invention is defined by the following claims. We therefore claim as our invention all that comes within the scope and spirit of these claims.

We claim:

1. A method comprising:
    while a test system connector remains connected to an input port of a mobile device having a display, a memory, and a processor, performing a first simulation comprising:
    providing one or more data connector power signals to the mobile device via the test system connector;
    simulating a connector insertion delay that occurs when a connector is inserted into the input port of the mobile device, the connector insertion delay caused by the physical layout of corresponding conductors in the input port of the mobile device and the connector; and
    providing, after the simulated connector insertion delay, one or more data connector data signals to the mobile device via the test system connector,
    wherein different speeds at which the test system connector and the input port of the mobile device can be physically connected together are simulated by varying the simulated connector insertion delay such that a longer simulated connector insertion delay simulates a slower speed of physically bringing the test system connector and the input port of the mobile device together and a shorter simulated connector insertion delay simulates a faster speed of physically bringing the test system connector and the input port of the mobile device together.

2. The method of claim 1, wherein the one or more data connector power signals and the one or more data connector data signals are provided based at least in part on a security command.

3. The method of claim 1, wherein the test system connector is a USB connector, wherein the input port of the mobile device is a USB port, and wherein the data connector data signals comprise a data plus and a data minus signal that form a differential pair.

4. The method of claim 1, wherein the connector insertion delay is variable, and further comprising:
    performing a second simulation comprising:
    receiving a user input selecting a value for a second connector insertion delay that is different from a value of the connector insertion delay in the first simulation;
    providing a second set of one or more data connector power signals to the mobile device via the test system connector;
    simulating the second connector insertion delay; and
    providing, after the second connector insertion delay, a second set of one or more data connector data signals to the mobile device via the test system connector,
    wherein the value of the connector insertion delay in the first simulation simulates establishing a physical connection between the test system connector and the input port of the mobile device at a first speed, and wherein the value of the second connector insertion delay in the second simulation simulates establishing a physical connection between the test system connector and the input port of the mobile device at a second speed that is different from the first speed.

5. The method of claim 1, wherein the connector insertion delay mimics establishing a connection between the test system connector and the input port of the mobile device without physically disconnecting and reconnecting the test system connector and the input port of the mobile device.

6. The method of claim 5, wherein the variable delay has a length based at least in part on a user input.

7. A universal serial bus (USB) device test apparatus comprising:
    a first circuit configured to provide power to a USB device test connector responsive to an input signal;
    a second circuit configured to provide a data plus signal and a data minus signal to the USB device test connector responsive to a delayed version of the input signal; and
    a time delay circuit configured to receive the input signal and to produce the delayed version of the input signal to which the second circuit is responsive, the time delay circuit being configurable to vary a delay between the input signal being provided to the first circuit and the delayed version of the input signal, wherein the delay mimics a USB connector insertion delay that occurs when establishing a connection of the USB device test apparatus to a USB device without physically disconnecting and reconnecting the USB device test apparatus and the USB device,
    wherein different speeds at which the USB device test apparatus and the USB device can be physically connected together are simulated by varying the delay such that a longer delay simulates a slower speed of physically bringing the USB device test apparatus and the USB device together and a shorter delay simulates a faster speed of physically bringing the USB device test apparatus and the USB device together.

8. The apparatus of claim 7, wherein the first circuit comprises a latching relay.

9. The apparatus of claim 7, wherein the second circuit comprises a solid state switch.

10. The apparatus of claim 7, wherein the USB device is a mobile device having a display, a memory, and a processor.

11. The apparatus of claim 7, wherein the USB device test connector is coupled to one or more storage devices.

12. One or more computer storage devices storing computer-executable instructions that, when executed by a computing device, cause the computing device to perform a method, the method comprising:
    while a test system connector remains connected to an input port of a mobile device having a display, a memory, and a processor, performing a simulation comprising:

providing a first set of one or more signals to the mobile device via the test system connector, the first set of one or more signals comprising one or more data connector power signals;

selecting a connector insertion delay that follows the providing the first set of one or more signals, wherein the length of the selected connector insertion delay simulates, without physically disconnecting and reconnecting the test system connector and the input port of the mobile device, a delay that would occur when the test system connector and the input port of the mobile device are actually physically brought together at a particular speed; and providing, after the selected connector insertion delay following the providing of the first set of one or more signals, a second set of one or more signals to the mobile device, the second set of one or more signals comprising one or more data connector data signals, wherein different speeds at which the test system connector and the input port of the mobile device can be physically connected together are simulated by varying the selected connector insertion delay such that a longer selected connector insertion delay simulates a slower speed of physically bringing the test system connector and the input port of the mobile device together and a shorter selected connector insertion delay simulates a faster speed of physically bringing the test system connector and the input port of the mobile device together.

13. A multi-device test system comprising:

a control unit configured to test a plurality of battery-powered devices, the respective battery-powered devices having a USB input port;

a plurality of test circuits, each of the respective test circuits being configured to test a respective one of the plurality of battery-powered devices and comprising:

a first circuit configured to provide power to a USB device test connector responsive to an input signal from the control unit;

a second circuit configured to provide a data plus signal and a data minus signal to the USB device test connector responsive to a delayed version of the input signal; and a time delay circuit configured to receive the input signal and, using a delay, produce the delayed version of the input signal to which the second circuit is responsive, wherein the delay simulates a USB connector insertion delay that occurs when establishing a connection between the USB device test connector and the USB input port of the battery-powered device, and wherein simulating the USB connector insertion delay using the time delay circuit allows simulation of the USB connector insertion delay without physically disconnecting and reconnecting the USB device test connector and the battery-powered device, wherein different speeds at which the USB device test connector and the USB input port can be physically connected together are simulated by varying the delay such that a longer delay simulates a slower speed of physically bringing the USB device test connector and the USB input port together and a shorter delay simulates a faster speed of physically bringing the USB device test connector and the USB input port together; and a multiplexer that communicates test commands from the control unit to the plurality of test circuits.

14. The system of claim 13, further comprising a control computer coupled to the control unit, the control computer configured to transmit the input signal to the control unit.

15. The system of claim 13, further comprising an electronic device, the electronic device being coupled to the USB device test connector.

16. The system of claim 13, the input signal having being sent in response to one or more security determinations.

17. The system of claim 13, further comprising a client computer coupled to the control unit, the control unit being configured to control access of the client computer to data received through the USB device test connector.

* * * * *